(12) United States Patent (10) Patent No.: US 9,183,007 B2
Burckart et al. (45) Date of Patent: *Nov. 10, 2015

(54) DYNAMIC DETERMINATION OF APPLICATION SERVER RUNTIME CLASSLOADING

(75) Inventors: Erik J. Burckart, Durham, NC (US); Andrew Ivory, Durham, NC (US); Todd E. Kaplinger, Durham, NC (US); Stephen J. Kenna, Research Triangle Park, NC (US); Aaron K. Shook, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 13/407,663

(22) Filed: Feb. 28, 2012

(65) Prior Publication Data

US 2012/0159466 A1    Jun. 21, 2012

Related U.S. Application Data

(62) Division of application No. 12/828,286, filed on Jun. 30, 2010, now Pat. No. 8,510,728.

(51) Int. Cl.
*G06F 9/44* (2006.01)
*G06F 9/445* (2006.01)

(52) U.S. Cl.
CPC .................... *G06F 9/445* (2013.01)

(58) Field of Classification Search
USPC ........................................ 717/166
See application file for complete search history.

(56) References Cited

U.S. PATENT DOCUMENTS

| | | | |
|---|---|---|---|
| 7,296,255 B2 | 11/2007 | Garms et al. | |
| 7,870,546 B2 * | 1/2011 | Meduri et al. | 717/166 |
| 8,104,025 B2 * | 1/2012 | Hogg et al. | 717/140 |
| 8,392,464 B2 * | 3/2013 | Bloesch et al. | 707/796 |
| 8,499,311 B2 * | 7/2013 | Blohm et al. | 719/328 |
| 2006/0143622 A1 * | 6/2006 | Prabandham et al. | 719/328 |
| 2008/0046882 A1 | 2/2008 | Blackhouse | |
| 2008/0127070 A1 | 5/2008 | Barcia et al. | |
| 2008/0162493 A1 | 7/2008 | Blohm et al. | |
| 2009/0070758 A1 | 3/2009 | Kalagnanam et al. | |
| 2009/0106747 A1 | 4/2009 | Arcese | |
| 2009/0217306 A1 | 8/2009 | Wusthoff et al. | |
| 2009/0276755 A1 | 11/2009 | Beltowski et al. | |
| 2009/0276769 A1 * | 11/2009 | Brannen et al. | 717/174 |
| 2011/0067013 A1 * | 3/2011 | Frost et al. | 717/148 |
| 2012/0005663 A1 * | 1/2012 | Burckart et al. | 717/166 |

* cited by examiner

*Primary Examiner* — Li B Zhen
*Assistant Examiner* — Sen Chen
(74) *Attorney, Agent, or Firm* — Steven M. Greenberg, Esq.; CRGO LAW

(57) ABSTRACT

Embodiments of the present invention provide a method, system and computer program product for dynamic selection of a runtime classloader for a generated class file. In an embodiment of the invention, a method for dynamic selection of a runtime classloader for a generated class file is provided. The method includes extracting meta-data from a program object directed for execution in an application server and determining from the meta-data a container identity for a container in which the program object had been compiled. The method also includes selecting a container according to the meta-data. Finally, the method includes classloading the program object in the selected container.

4 Claims, 2 Drawing Sheets

DYNAMIC DETERMINATION OF APPLICATION SERVER RUNTIME CLASSLOADING

CROSS-REFERENCE TO RELATED APPLICATIONS

This application is a Divisional of U.S. application Ser. No. 12/828,286, filed Jun. 30, 2010, now U.S. Pat. No. 8,510,728, the entirety of which is incorporated herein by reference.

BACKGROUND OF THE INVENTION

1. Field of the Invention

The present invention relates to classloading in a virtual machine and more particularly to runtime classloader determination for class objects executing in a virtual machine.

2. Description of the Related Art

The class loader mechanism forms part of the foundation of the modern, virtual machine. In particular, classloaders provide the translation technology that can convert serialized byte code into named classes for execution in the virtual machine. Notably, classloaders can perform this conversion regardless of the storage means and location of the byte code. As a result, the virtual machine need not know the operational specifics associated with the file systems storing the byte code. In conventional runtime environments like the Java® runtime environment (Java is a trademark of Sun Microsystems of Palo Alto, Calif., United States), classes can be introduced when they are referenced by name in a class that already is executing within the runtime environment. While the entry point class of an application can require some individual processing exclusive of the classloading mechanism, subsequent attempts at loading other classes are performed exclusively by the class loader.

In the Java runtime environment, the virtual machine can include one class loader embedded within the virtual machine. Referred to as the "primordial" class loader, this embedded class loader automatically resolves references to class names by reference to a specified repository of trusted classes which can be run by the virtual machine without verification. Earlier class loading technology permitted developers to load classes from a variety of disparate locations, including file systems, remote hosts, and the like. Yet, this type of flexibility carried the price of complexity. More recent class loading technology reduces this complexity using a parent/child delegation model in which each customized class loader delegates class loading to its parent class loader that either can be another customized class loader or the primordial class loader.

Application servers permit application isolation through extensive use of customized class loading. In particular, in the virtual machine environment, each class can be defined by a class name and the classloader that loaded the class. Hence, a class can be loaded only once by a given class. Still, the same class can be loaded multiple times using separate classloaders within the same virtual machine. As a result, applications can be isolated in the virtual machine. Moreover, different versions of the same class can be utilized in different applications simultaneously. Of note, distributed technologies such as Open Services Gateway Initiative (OSGi) framework depend upon the isolation of applications afforded by customized class loading.

Recent advancements in component based application development including that prevalent in the OSGi framework permit the use of scripting languages not native to the virtual machine in source code that is native to the virtual machine. Examples include Java Server Page (JSP) technology, "facelets" and the like. Upon deployment, the non-native scripts can be translated into native source code by a corresponding container, such as a JSP container. Thereafter, the translated source code can be compiled and executed in the application server environment. During the translation phase, however, the classloader implicated for the translated source code will be associated with the container and not necessarily the application server environment in which the translated source code once compiled is deployed. Thus, an inconsistency in classloader specification can arise.

BRIEF SUMMARY OF THE INVENTION

Embodiments of the present invention address deficiencies of the art in respect to classloader selection and provide a novel and non-obvious method, system and computer program product for dynamic selection of a runtime classloader for a generated class file. In an embodiment of the invention, a method for dynamic selection of a runtime classloader for a generated class file is provided. The method includes extracting meta-data from a program object directed for execution in an application server and determining from the meta-data a container identity for a container in which the program object had been compiled. The method also includes selecting a container according to the meta-data. Finally, the method includes classloading the program object in the selected container.

In one aspect of the embodiment, determining from the meta-data a container identity for a container in which the program object had been compiled includes more specifically determining from the meta-data both a container identity and also a container version for a container in which the program object had been compiled. In another aspect of the embodiment, the method further can include identifying a set of components upon which the program object depends according to the selected container and deploying the identified set of components into the selected container prior to classloading the program object. In yet another aspect of the embodiment, the program object is a class file in an OSGI bundle and the process described herein can be repeated for a plurality of class files in the OSGI bundle.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, data processing system and computer program product for dynamic selection of a runtime classloader for a generated class file. In accordance with an embodiment of the invention, script disposed within source code conforming to a language for a container in a modular application execution environment such as OSGi can be translated into additional source code conforming to the language for the container and compiled into a container class object. Meta-data additionally can be written to the compiled container class object. The meta-data can include, for example, versioning information for the container. Thereafter, at run-time the meta-data for the container class object can be read and a corresponding container can be selected based upon the meta-data. Finally, the container class object can be loaded into the selected container using a classloader for the selected container. In this way, consistency can be maintained between the container used for translation and compilation and the container used for execution.

Figure 1:
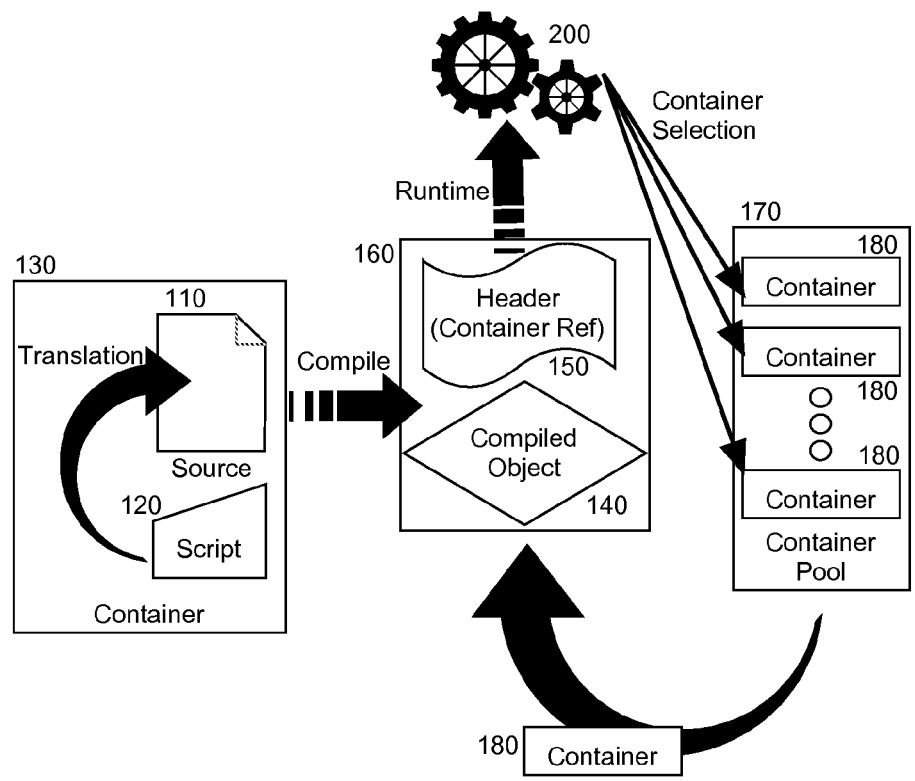
FIG. 1 is a pictorial illustration of a process for dynamic selection of a runtime classloader for a generated class file.

In further illustration, FIG. 1 pictorially shows a process for dynamic selection of a runtime classloader for a generated class file. As shown in FIG. 1, source code 110 compliant with a programming language native to a container 130 can include script 120 in a language not native to the container 130. The script 120 can be translated within the container 130 into programming language native to the container 130 and embedded within the source code 110. Thereafter, the source code 110 can be compiled into compiled code 140 such as a class file for subsequent execution. Of note, meta-data 150 can be included with the compiled code 140 to form executable object 160. The meta-data 150 can include an identification of the container 130 including versioning information.

At runtime, container selection data processing system 200 can extract the meta-data 150 from the executable object 160. Using the meta-data 150, the container selection data processing system 200 can determine a most appropriate container 180 amongst a pool of containers 170 for use in deploying the executable object 160 for execution. Thereafter, the selected container 180 can be used to deploy the executable object 160. Consequently, companion bundles of components requisite to the proper operation of the executable object 160 can be assured when those bundles vary depending upon the container 130 used for the translation of the script 120 and compilation of the source code 110 into the compiled code 140.

Figure 2:
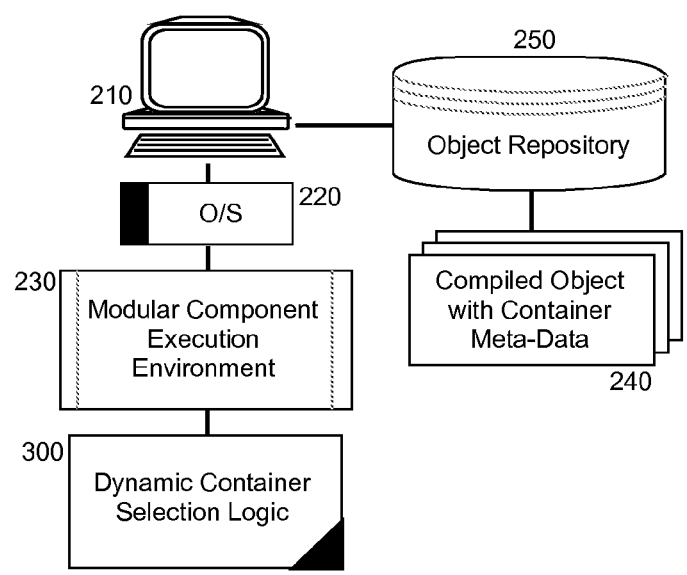
FIG. 2 is a schematic illustration of a data processing system configured for dynamic selection of a runtime classloader for a generated class file; and, FIG. 3 is a flow chart illustrating a process for dynamic selection of a runtime classloader for a generated class file.

In further illustration, FIG. 2 schematically shows a data processing system configured for dynamic selection of a runtime classloader for a generated class file. The system can include a host computer 210 including at least one processor and memory. An operating system 220 can execute in the memory by at least one of the processors of the computer 210. The operating system 220 during execution can host the operation of a modular component execution environment 230 such as that configured to manage the execution of an OSGi application of different bundles of class objects.

Of note, an object repository 250 of different executable objects 240 can be coupled to the computer 210 and accessible by the module component execution environment 230. In this regard, the different executable objects 240 can be aggregated together into one or more bundles and deployed into different containers for execution and management by the modular component execution environment 230. To facilitate in the selection of the different containers into which different executable objects 240 are to be deployed and loaded by corresponding classloaders, dynamic container selection logic 300 can be coupled to the modular component execution environment 230.

The dynamic container selection logic 300 can include program code that when executed by at least one processor of the computer 210, can identify in a selected one or more of the executable objects 240 selected for execution, meta-data pertaining to the container used to translate script into source code native to the container, and to compile the source code into an executable object. For instance, the meta-data can include versioning information for the container. The program code further when executed can use the meta-data to select a container into which a selected one of the executable objects 240 is to be deployed so as to ensure compatibility between the selected one of the executable objects and the chosen container, and also to assure the contemporaneous execution of companion components requisite to the operation of the selected one of the executable objects in the selected container.

Figure 3:
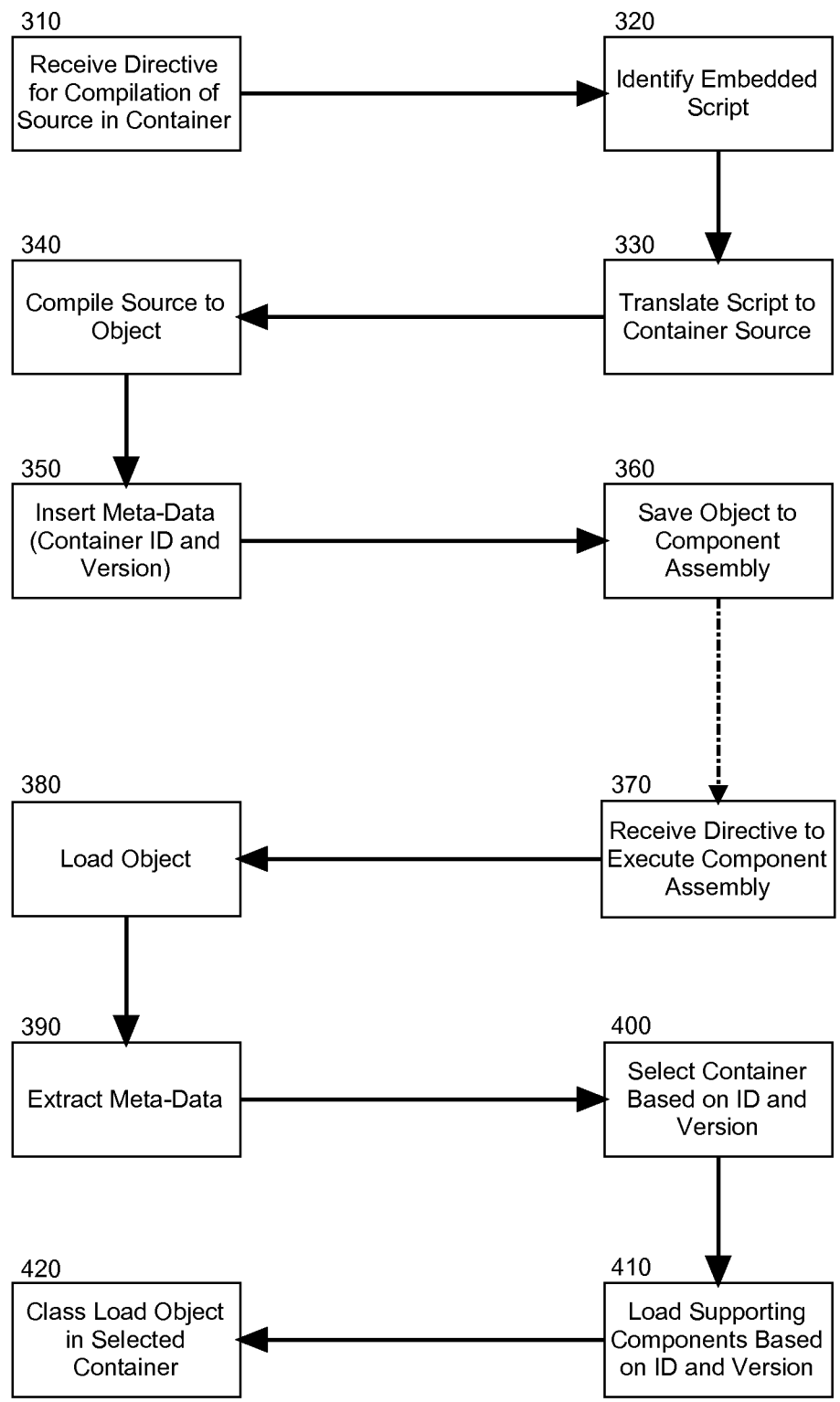

In yet further illustration of the operation of the dynamic container selection logic 300, FIG. 3 is a flow chart illustrating a process for dynamic selection of a runtime classloader for a generated class file. Beginning in block 310, a directive can be received in a container to compile source code conforming to a programming language of the container. In block 320, an embedded script can be identified within the source and in block 330 the embedded script can be translated to conform to the programming language. Thereafter, in block 340, the source code with translated embedded script can be compiled into a program object. In block 350, meta-data identifying the container and its version can be written to the program object and in block 360, the program object can be saved as part of a component assembly.

In block 370, a directive can be received to load and execute the component assembly. In response, in block 380 the program object can be loaded and in block 390, the meta-data can be extracted from the program object. In block 400, a particular container can be selected for hosting the operation of the program object according to the container and container version of the meta-data. Additionally, in block 410, supporting components such as dependencies can be located and loaded into the particular container based upon the container and container version of the meta-data. Finally, in block 420 the classloader for the particular container can be used to load the program object for execution in the particular container.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for dynamic selection of a runtime classloader for a generated class file, the method comprising:
   receiving a directive in a container to compile source code compliant with a programming language native to the container;
   identifying in the source code an embedded script in a language not native to the container;
   translating the embedded script into the programming language native to the container;
   compiling the source code with the translated embedded script into a program object;
   writing to the program object, meta-data identifying the container and its version;

receiving a directive for execution of the program object in an application server;

extracting the meta-data from the program object directed for execution in the application server;

determining directly from the extracted meta-data a container identity for the container in which the program object had been compiled;

selecting a container from a pool of containers according to the determined container identity; and, classloading the program object in the selected container.

2. The method of claim 1, further comprising:

identifying a set of components upon which the program object depends according to the selected container; and, deploying the identified set of components into the selected container prior to classloading the program object.

3. The method of claim 1, wherein the program object is a class file in an open services gateway initiative (OSGI) bundle.

4. The method of claim 3, further comprising repeating each of the extracting, determining, selecting and classloading for each of a plurality of class files in the OSGI bundle.

* * * * *